July 8, 1969      V. YAGER      3,453,909
SHEAR PLATE AND SCREEN FOR DRY SHAVER
Filed March 27, 1968
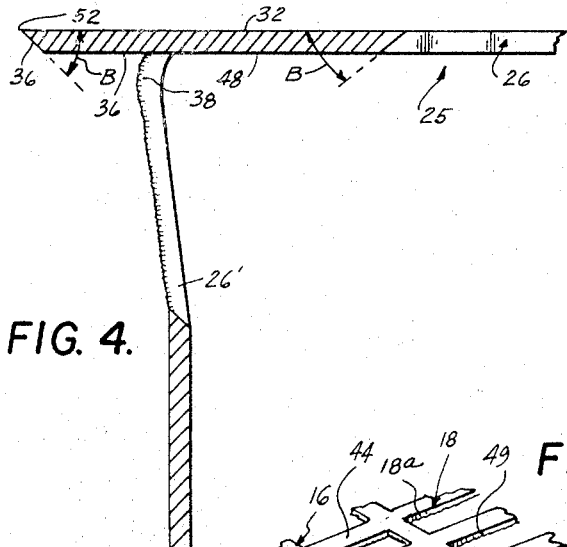
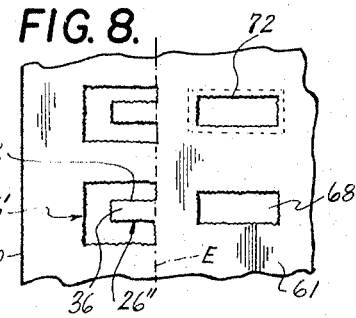
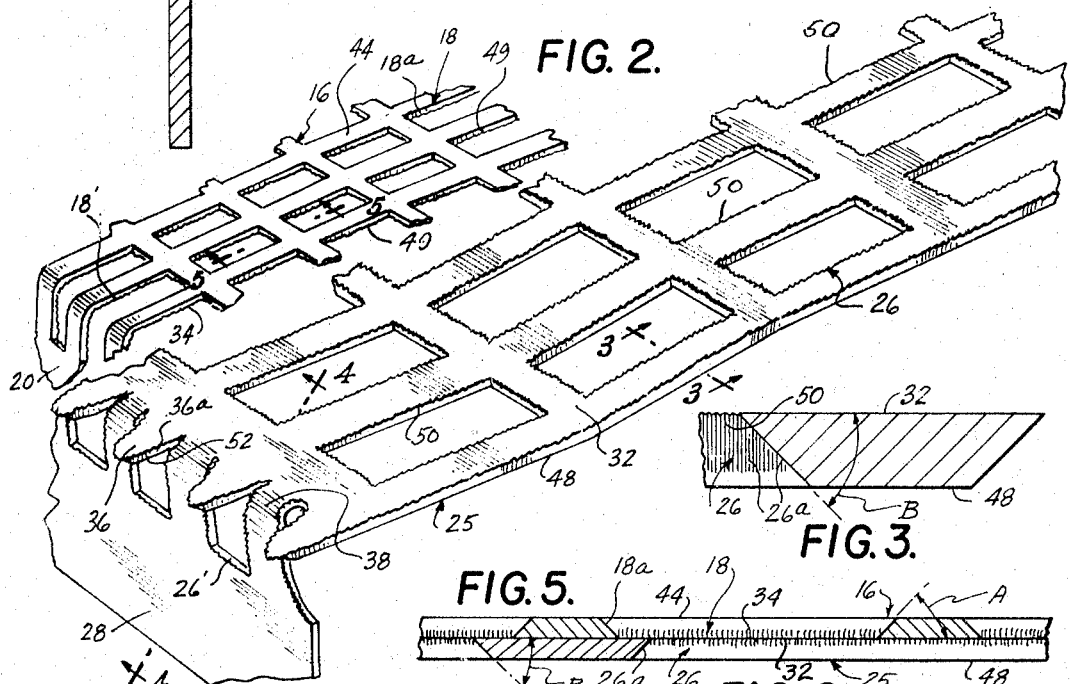
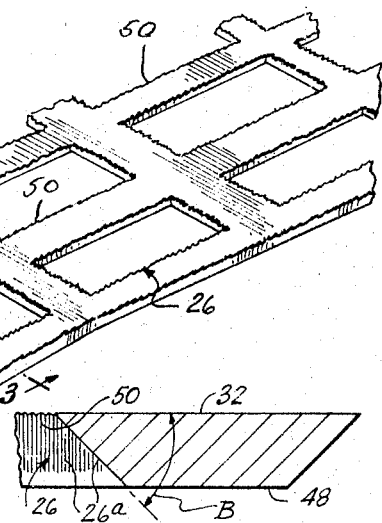
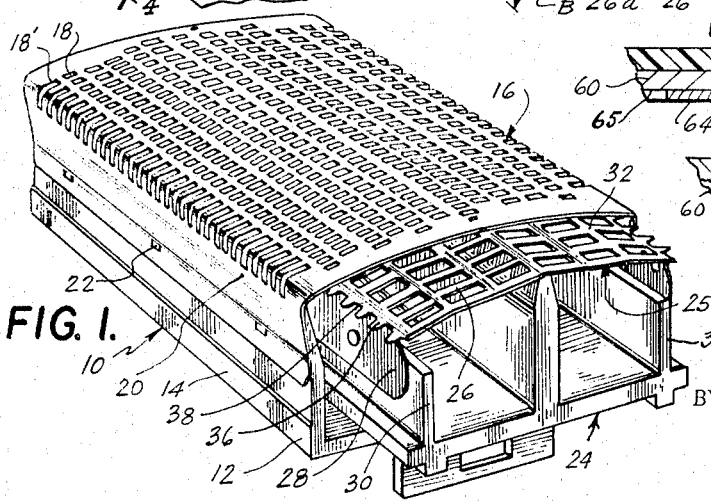
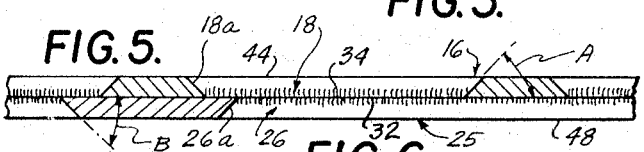
INVENTOR.
VICTOR YAGER
BY *Polachek & Saulsbury*
ATTORNEYS United States Patent Office 3,453,909
Patented July 8, 1969

3,453,909
SHEAR PLATE AND SCREEN FOR DRY SHAVER
Victor Yager, 27—12 Ditmars Blvd.,
Astoria, N.Y. 11105
Filed Mar. 27, 1968, Ser. No. 716,617
Int. Cl. B26b *19/06, 29/00*
U.S. Cl. 76—104                                     3 Claims

ABSTRACT OF THE DISCLOSURE

A shear plate and screen assembly for a dry shaver is disclosed in which both cooperating members of the assembly have ragged intersecting cutting edges. Each cutting edge has an acute rake angle. The shear plate and screen are formed by a photofabrication method which includes etching thin metal plates at one side only in predetermined apertured patterns so that each edge has a ragged, raked configuration. A shear plate is also described having integral projections formed with ragged, raked cutting edges.

---

The invention relates to the art of dry shaving implements and more particularly concerns a novel construction for shear plates and screens of dry shavers.

Heretofore, shear plates and screens for dry shavers have been made of a thin sheet steel by die punching the necessary holes. After punching, precision grinding is required to form sharp cutting edges and to flatten the abutting sides of the shear plate and screen to insure close contact with each other during their reciprocal movement in a dry sheaver.

It has also been known heretofore to manufacture articles from thin metal sheets by photofabrication including chemical etching. Such a method is described in U.S. Patent 2,735,763 and British Patent 845,832 which are typical of the art. In the general practice of this method, it is usual to etch the metal sheets at both sides simultaneously in order to minimize the effects of lateral erosion of the metal and to accomplish perforation of the metal sheets in the shortest possible time. In such a method a principal purpose is to achieve smooth, unbroken straight or curved edges conforming as precisely as possible to a predetermined pattern.

The present invention employs chemical etching to form shear plates and screens of dry sheavers but departs from conventional practice by etching the thin sheet metal only at one side at a comparatively fast rate of penetration so that a knife edge is formed around each hole of a predetermined pattern. In addition the knife edges are all serrated or jagged and have a sharp rake angle. When the shear plate and screen so fabricated are juxtaposed to each other, and the shear plate is reciprocated in a dry shaver, the abutted jagged knife edges of the shear plate and screen intersect each other and effectively cut the hairs inserted into the holes in the screen. This mode of operation of a dry shaver is materially different from present practice. In conventional dry shavers, the sides of holes in the screen and shear plate are all straight, smooth and perpendicular to the planes of the screen and plate. There are no knife edges with raked angles at edges of the holes. Thus the hairs are sheared off by blunt edges rather than being cut or sawed off by serrated knife edges as featured in the present invention.

The invention will be explained in further detail in connection with the drawing, wherein:

FIGURE 1 is a perspective view of a cutting head of an electric shaver, including an assembly of screen and shear plate embodying the invention.

FIG. 2 is a greatly magnified perspective view of parts of a screen and shear plate assembly according to the invention.

FIG. 3 and FIGS. 4 and 5 are fragmentary sectional views on further enlarged scales, taken on lines 3—3, 4—4 and 5—5 respectively of FIG. 2.

FIG. 6 is an enlarged framentary sectional view of a metal sheet shown at one stage of the manufacturing process.

FIG. 7 is a view similar to FIG. 6 showing the metal sheet at a later stage of the manufacturing process.

FIG. 8 is a fragmentary plan view of the metal sheet of FIGS. 7 and 8 at a later stage of the manufacturing process.

Referring to FIG. 1, there is shown a head 10 of an electric shaver including a generally rectangular channel-shaped frame 12 having upstanding side walls 14. A generally rectangular screen 16 overlays the frame 12. The screen has a multiplicity of generally rectangular fine holes 18. Marginal portions of the screen are bent down to form lateral flanges 20 which are attached to walls 14 of the frame by rivets 22 or other suitable attachment means. Slidably disposed inside frame 12 on a reciprocable channel-shaped carrier 24 is a shear plate 25. This plate 25 is generally rectangular in form and is provided with a multiplicity of elongated generally rectangular holes 26; see FIG. 2. Marginal portions of the shear plate are bent down to form lateral flanges 28 which are secured to side walls 30 of the carrier 24. The upper face 32 of the shear plate 25 abuts and reciprocates longitudinally of the under face 34 of the screen 16 to cut off hairs inserted through holes 18 and 26. Rows of sharp, knife edged projections 36 extend laterally outwardly of both edges 38 of the shear plate 25. These projections intersect long marginal holes 18′ formed in the screen 16 and serve for cutting long hairs inserted into holes 18′. Holes 26′ extend downwardly below projections 36.

FIGS. 2, 4 and 5 clearly show the configuration of the holes in the screen and shear plate to best advantage. It will be noted that each hole 18 and 18′ in the screen is wider and longer at the smooth outer or upper face 44 of the screen and slightly narrower and shorter at the under face 34. The side walls 18a of the holes slant outwardly so that they are disposed at acute rake angles A to the bottom or under face 34 of the screen. Similarly, each hole 26 in the shear plate 25 is wider and longer at the smooth bottom or under face 48 of the shear plate 25 and is narrower and shorter at the upper face 32. Inner sides 26a of the holes are slanted inwardly so that they are disposed at acute rake angle B to the upper face 34. The knife edges 49 and 50 of the holes in the screen 16 and shear plate 25 are all serrated or jagged. Projections 36 have similar configurations with sharp, jagged or ragged knife edges 52 at upper face 34 of the shear plate 25. Sides 36a of the projections are slanted with respect to the upper face 34 of the shear plate at acute rake angle B indicated in FIG. 5, so that the knife edges 52 are very sharp and ragged.

By inspection of FIG. 2, it will be noted that very effective cutting as well as shearing action is obtained as the shear plate 25 reciprocates under and against the screen 16. The knife edges 49 and 50 intersect each other to cooperate in cutting hair effectively.

FIGS. 6, 7 and 8 show steps in the manufacturing process of a screen or shear plate. A thin stainless steel plate or sheet 60 having a thickness of about 50 to 100 microns is coated at one face 61 with a layer 62 of acid etchant resistant material. A layer 64 of photo and etchant resistant material is applied to the other face 65 of the sheet 60. This layer 64 can be applied by methods preferred by those engaged in the art. A photographic image of the desired pattern is obtained to reveal open uncovered areas 66 of face 64. The coated plate 60 is then treated in an etchant acid bath and etching takes place. Holes 68 are formed as shown in FIG. 7. The sides 70 of the holes are wider at face 65 than at face 61 and knife edges 72 are formed at resist layer 62. These knife edges are serrated and jagged and are defined by the rake angle D between sides 70 of the holes and face 61 of the plate 60. Thereafter, the layers 62 and 64 of etchant resistant material are removed by a suitable solvent. The photographic and etching techniques disclosed in the U.S. Patent 2,544,905 can be adapted to the manufacture of apertured screens and shear plates as described above.

After formation of the holes 68 with ragged knife edges 72, margins of the plate or sheet 60 can be bent on lines such as line E indicated in FIG. 8 to form flanges 20 or 28 shown in FIGS. 1 and 2. If plate 60 is to be a shear plate, then when flanges 28 are formed, reentrant portions 26" of marginal holes 26' will define the projections 36 with knife edges 52. After formation of the channel-shaped screen and shear plate, the assembly of the shaver head 10 can then be completed by attachment of the screen and shear plate to the channel-shaped frame 12 or carrier 24. The etchant resistant material will have removed.

The method described is capable of producing a very thin screen and shear plate having very small holes or precise, predetermined shape. The holes can be round, rectangular, parallelogrammic or of other geometrical shape. If desired for certain types of shaver heads, only the shear plate can be treated as described to form jagged knife edges at upper side 32 abutting the under face 34 of the screen 16. The holes 18 in the screen 16, can then be made as heretofore by mechanical methods so that the side walls of the holes are perpendicular to the under face 34 of the screen 16.

While I have illustrated and described the preferred embodiments of my invention it is to be understood that I do not limit myself to the precise construction herein disclosed and that various changes and modifications may be made within the scope of the invention as defined in the appended claims.

What is claimed is:
1. A method of manufacturing a hair cutting member of a dry shaver head, comprising the steps of applying a first etchant resistant layer to one face of a thin metal plate to form an imperforate first layer covering the entire one face, applying a second etchant resistant to the other face of the plate so that a second layer with a multiplicity of photographically produced holes is formed covering the entire other face of the plate, applying an etchant to the plate to form holes extending entirely through the plate at the holes in the second layer, stopping application of the etchant as soon as the etchant reaches the first etchant resist at said one face of the plate so that each hole formed in the plate has a ragged knife edge with acute rake angle at said one face of the plate, and then removing the etchant resistant layers from both sides of the plate.

2. A method as defined by claim 1, comprising the further step of bending marginal portions of the plate to form a channel-shaped structure adapted to form part of the dry shaver head.

3. A method as defined in claim 1, wherein certain of said holes formed at margins of the plate have reentrant edge portions, said method comprising the further step of bending the margins of the plate to form a channel-shaped structure, whereby the reentrant portions of said certain holes will form projections extending laterally of said flanges, each of the projections having a ragged knife edge at an acute rake angle to one face of the plate.

References Cited
UNITED STATES PATENTS

| | | | |
|---|---|---|---|
| 2,234,894 | 3/1941 | Bruecker | 76—104 |
| 2,735,763 | 2/1956 | Heath | 96—38.2 |

BERNARD STICKNEY, *Primary Examiner.*

U.S. Cl. X.R.

30—346.51